3,319,417
INTERNAL COMBUSTION ENGINE TYPE MOTOR
POWER GENERATING APPARATUS
Otoharu Ishizaka, 39 1-chome, Harigaya-cho,
Urawa, Japan
Filed Aug. 24, 1965, Ser. No. 482,102
Claims priority, application Japan, Mar. 22, 1965,
40/16,285
15 Claims. (Cl. 60—37)

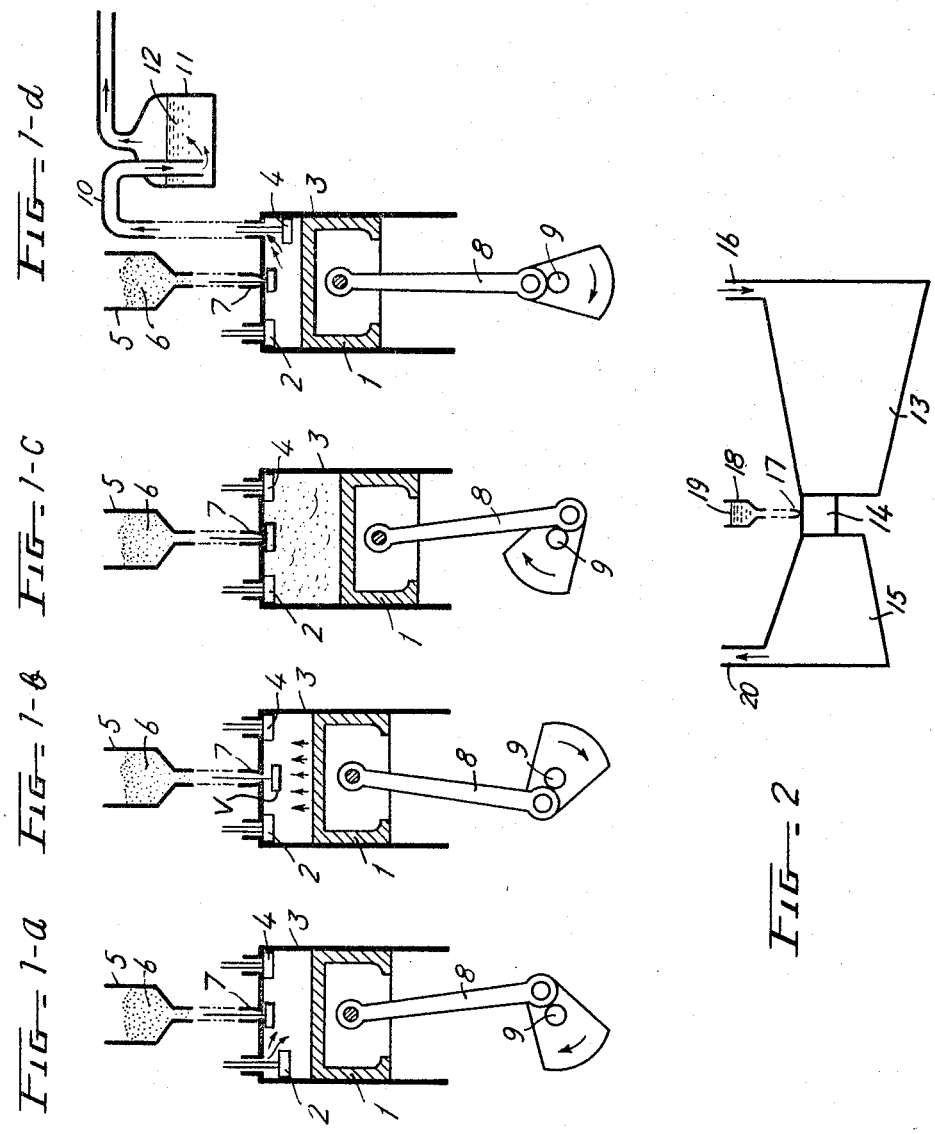

This invention relates to internal combustion engines.

Internal combustion engines such as compressed ignition engines, spark ignition engines, gas turbines, jet engines, are known which utilize the expansion of fuels such as gasoline, due to combustion. This type of device, while being very useful, nevertheless is subject to such disadvantages that, for example, there is produced a gas which is harmful to the human body such as carbon monoxide, sulfurous acid fumes, or the like. Moreover, known engines are liable to be injured by high temperatures.

The present invention relates to an internal-combustion-engine-type motive power generating apparatus which is free from the above defects and is characterized in that, instead of combustion of fuel, the thermal decomposition expansion of ammonium carbonate is utilized.

The term "ammonium carbonate" in connection with this invention is intended to be generic to ammonium bicarbonate ($NH_4HCO_3$) and normal ammonium carbonate (($NH_4)_2CO_3H_2O$). Either of these ammonium carbonates can be used in solid state or in the form of an aqueous solution. Ammonium bicarbonate and normal ammonium carbonate are easily decomposed into carbon dioxide gas and ammonia gas at comparatively low temperatures, that is, from 60° C. for the former and from 58° C. for the latter, to increase their respective volumes. At temperatures above 100° C., additionally all of the water of crystallization thereof and any water content actually adhering thereto are converted to steam and the volume of the decomposition gas increases further.

By way of example, normal ammonium carbonate is decomposed into one molecule of ammonia gas and one molecule of ammonium bicarbonate, and the ammonium bicarbonate is further decomposed into one molecule of ammonia gas and one molecule of carbon dioxide gas. The water of crystallization is completely converted to steam at a temperature above 107° C. Thus, one molecule of ammonium carbonate increases five times in volume upon being decomposed by heat, the resulting gas comprising two molecules of ammonia gas, one molecule of carbon dioxide and two molecules of steam.

Examples of the present invention will next be explained with reference to the accompanying drawing, in which:

FIGURE 1 diagrammatically illustrates a four-cycle engine with which the invention is adapted to operate, FIGURES 1a–d illustrating the successive strokes; and FIGURE 2 illustrates the invention operative with respect to a turbine engine.

FIG. 1, more particularly, shows an example of the present invention adapted to the conventional four-cycle engine. FIG. 1a shows the suction stroke; FIG. 1b shows the compression stroke; FIG. 1c shows the explosion stroke; and FIG. 1d shows the exhaust stroke.

In greater detail, suction valve 2 opens when piston 1 is positioned at the upper dead center and gas such as air is taken into a cylinder 3 as the piston 1 is lowered (FIG. 1a). Besides air, any kind of gas such as carbon dioxide gas, ammonia gas and others not having a chemical reaction with ammonium carbonate, can be taken into the cylinder 3. Additionally, these gases can be used either individually or in mixture.

Next, the piston 1 moves upwards, the suction valve 2 and exhaust valve 4 being closed to compress the gas within the cylinder 3 (FIG. 1b). Just before the end of this compression stroke, "ammonium carbonate" powder contained in a vessel 5 is projected through a projecting nozzle 7 into the cylinder 3. A valve V has been generally and diagrammatically indicated simply to show that the ammonium carbonate is not driven back into nozzle 7. Actually, the means for supplying the medium from vessel 5 into cylinder 3 can be of conventional construction for internal combustion engines, particularly fuel-injection type diesels. Thereupon the ammonium carbonate is decomposed by the temperature which reaches about 300° C. due to the compression of the gas. The ammonium carbonate is thus gasified into ammonia gas, carbon dioxide gas and steam and is accordingly expanded. The total pressure of all these gases pushes down explosively on the piston 1 (FIG. 1c). This force gives rotating motion to crank shaft 9 through a connecting rod 8. When the piston 1 is lowered to a point near the lower dead center of the explosion stroke, the exhaust valve 4 opens and the piston 1 is moved upwards so that the gas within the cylinder 1 is evacuated (FIG. 1d). The reciprocating movement of the piston is then repeated.

It is preferred that the ammonia gas contained in the exhaust gas not be discharged into the atmosphere because it is of irritating odor. Thus it is preferred that the same be caught in the course of its discharge. This can be readily accomplished. For example, carbon dioxide in excess is previously used for the suction-stroke gas and on exhaust the ammonia gas can be combined therewith. Alternatively, the exhaust gas can be passed through water or acidic liquid so that the ammonia gas contained therein is dissolved therein or combined as a salt.

In the apparatus illustrated in FIG. 1, an exhaust pipe 10 leads into an aqueous solution of hydrochloric acid 12 contained in a tank 11, thus guiding the exhaust gas through the hydrochloric acid. In this case the ammonia gas in the exhaust gas is converted into ammonia hydrochloride and only carbon dioxide is discharged into the air. In this way the exhaust gas becomes entirely harmless and the problem of contamination of the air, as is caused by the exhausting of harmful gases in conventional internal combustion engines, can be avoided.

A test conducted on the above apparauts is as follows:

A maximum output of about 40/3400 (H.P./r.p.m.) was obtained in a four-cycle engine having six cylinders in series, the cylinder inner diameter being 87.5 mm., the piston stroke being 114.3 mm., the total exhaust volume being 3956 cc., and the compression ratio being 7.0

The apparatus shown in FIG. 2 is a turbine engine of gas-turbine engine type wherein, instead of fuel projection, an aqueous solution of ammonium bicarbonate is used.

The turbine comprises a compressor 13, an explosion chamber 14 and a turbine 15, and a mixture of air and carbon dioxide gas introduced via a gas introducing opening 16 in the compressor 13 is moved leftwards and gradually compressed. When the compressed mixture has entered the forward explosion chamber 14, it reaches a high temperature, as high as 250° C. Ammonium bicarbonate 19 in liquid state in a vessel 18 is charged into chamber 14 through a projection nozzle 17 carried by the chamber 14, whereupon the ammonium bicarbonate is decomposed by heat and expanded into carbon dioxide, ammonia gas and steam. By the total pressure of these gases, the turbine 15 is rotated. The gas after passing through the turbine 15, is discharged through an exhaust opening 20. Thus the turbine is rotated by the thermal decomposition and expansion of ammonium carbonate.

An experiment conducted on the apparatus of FIG. 2 is as follows:

A turbine rotational speed of 5000 r.p.m. and an electric power of about $1.4 \times 10^5$ kwh., were obtained with a starting electric power of $6.2 \times 10^3$ kw. The flow of mixed air and carbon dioxide to the compressor was 100 m.$^3$/sec. while charging temperature of the gas was 50° C. The gas temperature in the explosion chamber was about 250° C. and the last compression ratio was 10.

Thus, the invention is sufficiently advantageous that the apparatus according to the present invention can be used instead of conventional internal combustion engines hitherto used for driving motor cars, ships, aeroplanes, electric generators and so forth. Gases such as carbon monoxide and sulfurous acid gas are not produced and air contamination is prevented. Damage of engines caused by superheating never results. Additionally, ammonium carbonate can be obtained economically and almost limitlessly.

What is claimed is:

1. Power generating apparatus comprising means responsive to expanding gas to generate power, and means to supply and cause the thermal decomposition and expansion of ammonium carbonate, said means being operatively associated to generate said power.

2. Power generating apparatus comprising a piston and cylinder, and means to supply ammonium carbonate to said cylinder and effect thermal decomposition and expansion of said ammonium carbonate to drive said piston.

3. Power generating apparatus comprising a compressor and turbine in operative association, and means to supply ammonium carbonate thereto, said ammonium carbonate being decomposed therein and expanding to drive said turbine.

4. Apparatus according to claim 1, comprising means to supply a gas inert to ammonium carbonate, one of said means compressing said gas to raise the temperature of said carbonate to decompose the same.

5. A power generating apparatus according to claim 1, wherein ammonia gas is generated by said decomposition, comprising means to discharge the ammonia gas through water.

6. A power generating apparatus according to claim 1, wherein ammonia gas is generated by said decomposition, comprising means to pass the ammonia gas through acidic liquid.

7. A power generating process comprising compressing a gas to increase the temperature thereof, projecting ammonium carbonate into the thusly heated gas to cause thermal decomposition and expansion of said carbonate, and driving a mobile member with the resulting expansion force.

8. A process as claimed in claim 7, wherein the ammonium carbonate is selected from the group consisting of normal ammonium carbonate and ammonium bicarbonate.

9. A process as claimed in claim 7, wherein the carbonate is in powder form.

10. A process as claimed in claim 7, wherein the carbonate is in aqueous solution.

11. Power generating apparatus comprising means for compressing a gaseous medium to raise the temperature thereof, means to project into the thusly heated gaseous medium a substance adapted to be thermally decomposed without ignition by the heated gaseous medium, said substance expanding upon being decomposed, and means to convert the expansion of said substance into a useful mechanical force, and means to supply said substance in the form of ammonium carbonate.

12. Apparatus as claimed in claim 11, wherein the carbonate decomposes into a plurality of gases including ammonia gas, comprising means to evacuate said gases and to trap the ammonium gas before venting the evacuated gases into the atmosphere.

13. A method comprising compressing a gaseous medium to heat the same, introducing into the thusly heated medium a substance adapted for being thermally decomposed thereby without ignition and for expanding upon being decomposed, and converting the resulting expansion of said substance into a mechanical force, the substance being ammonium carbonate.

14. A method as claimed in claim 13, wherein the gas is inert with respect to said carbonate.

15. A method as claimed in claim 14, comprising heating the gas sufficiently to convert any water which is present into steam.

References Cited by the Examiner

UNITED STATES PATENTS

| | | | |
|---|---|---|---|
| 121,909 | 12/1871 | Tellier | 60—37 |
| 2,830,435 | 4/1958 | Mallory | 60—27 |

OTHER REFERENCES

ASE Article: "Ammonia as a Spark Ignition Engine Fuel; Theory and Application," Jan. 10–14, 1966.

EDGAR W. GEOGHEGAN, *Primary Examiner.*